(12) United States Patent
MacQuin et al.

(10) Patent No.: US 9,377,560 B2
(45) Date of Patent: Jun. 28, 2016

(54) METHOD FOR RESTORING LOW ROUGHNESS OF OUTER SURFACE OF UNDERWATER SEISMIC SURVEY DEVICE

(71) Applicant: CGG SERVICES SA, Massy (FR)

(72) Inventors: Raphaël MacQuin, Montrouge (FR); Hélène Tonchia, Antony (FR); Karine Desrues, Massy (FR)

(73) Assignee: CGG SERVICES SA, Massy (FR)

( * ) Notice: Subject to any disclaimer, the term of this patent is extended or adjusted under 35 U.S.C. 154(b) by 93 days.

(21) Appl. No.: 14/186,214

(22) Filed: Feb. 21, 2014

(65) Prior Publication Data

US 2014/0242261 A1 Aug. 28, 2014

Related U.S. Application Data

(60) Provisional application No. 61/767,869, filed on Feb. 22, 2013.

(51) Int. Cl.
| | |
|---|---|
| *G01V 13/00* | (2006.01) |
| *G01V 1/18* | (2006.01) |
| *G01V 1/38* | (2006.01) |
| *B05D 5/00* | (2006.01) |
| *B05D 1/18* | (2006.01) |
| *B05D 3/12* | (2006.01) |
| *B63B 21/66* | (2006.01) |

(52) U.S. Cl.
CPC ............. *G01V 13/00* (2013.01); *B05D 5/005* (2013.01); *G01V 1/186* (2013.01); *G01V 1/3843* (2013.01); *B05D 1/18* (2013.01); *B05D 3/12* (2013.01); *B63B 21/66* (2013.01)

(58) Field of Classification Search
None
See application file for complete search history.

(56) References Cited

U.S. PATENT DOCUMENTS

| | | | |
|---|---|---|---|
| 7,835,222 B2 | 11/2010 | Lobe et al. | |
| 2009/0285051 A1* | 11/2009 | Poitzsch | G01V 1/38 367/19 |
| 2010/0020644 A1* | 1/2010 | Vignaux | G01V 1/201 367/154 |
| 2011/0174207 A1 | 7/2011 | Harrick et al. | |
| 2012/0176859 A1* | 7/2012 | Pabon | G01V 1/201 367/20 |

\* cited by examiner

*Primary Examiner* — William Phillip Fletcher, III
(74) *Attorney, Agent, or Firm* — Patent Portfolio Builders PLLC

(57) ABSTRACT

Various methods preserve or restore the low roughness throughout an outer shell of a device (e.g., a streamer) used underwater for seismic surveys, by applying various substances that fill micro-cracks, are easy to polish or are self-healing. Apparatuses used to implement these methods may be used shortly before the devices are deployed in water, for example, having the device passing through such an apparatus as it is moved to be deployed in water.

9 Claims, 10 Drawing Sheets

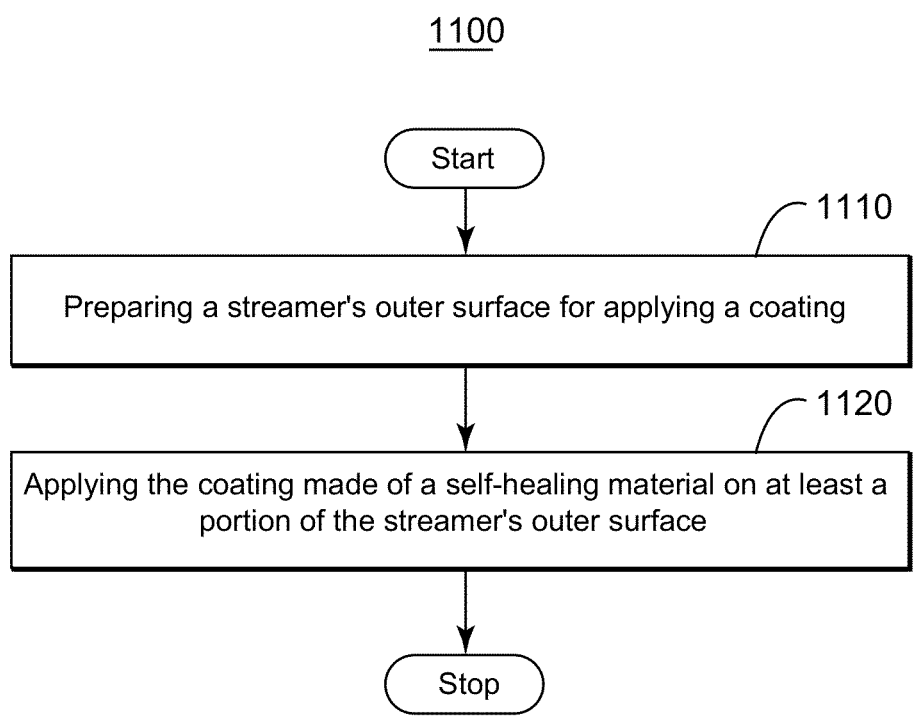

METHOD FOR RESTORING LOW ROUGHNESS OF OUTER SURFACE OF UNDERWATER SEISMIC SURVEY DEVICE

CROSS REFERENCE TO RELATED APPLICATIONS

This application claims priority and benefit from U.S. Provisional Patent Application No. 61/767,869, filed Feb. 22, 2013, for "Low Roughness Streamer Jacket and Method," the entire content of which is incorporated in its entirety herein by reference.

BACKGROUND

1. Technical Field

Embodiments of the subject matter disclosed herein generally relate to apparatuses and methods for preserving and restoring low roughness on the entire outer surface of a device (e.g., a streamer) used underwater for seismic surveys.

2. Discussion of the Background

Marine seismic surveys are used in the oil and gas industry to map and interpret potential petroleum reservoirs under the seafloor. The size and scale of seismic surveys has increased along with significant concurrent increases in computer power. While 3D seismic surveys are exploratory, 4D surveys are 3D seismic surveys repeated over a period of time to observe reservoir depletion during production and identify areas where there are barriers to flow that may not be easily detectable.

In marine seismic surveys, information is gathered by analyzing reflected and refracted seismic waves, which are detected by seismic receivers such as hydrophones distributed along cables towed by vessels or placed at the ocean bottom. These cables, known as streamers, which are deployed in water for long periods, may be damaged mechanically or due to proliferation of microorganisms (bio-fouling) on their outer surface. Micro-cracks in some areas are particularly dangerous for streamers because barnacles (prevalent in bio-fouling) prefer to attach to patches with higher roughness, which amplifies mechanical damage to the streamer jacket and, in time, renders the streamer unusable.

To diminish bio-fouling, it has been considered manufacturing streamers with a permanent outer layer that has anti-fouling properties (as disclosed, for example, in U.S. Pat. No. 7,835,222, U.S. Patent Application Publication No. 2010/0020644 and U.S. Patent Application Publication No. 2011/0174207, the contents of which are incorporated herein by reference). However, when the permanent outer layer with antifouling properties is damaged (e.g., mechanically or worn out) and higher roughness patches occur on the streamer's outside surface, bio-fouling increases on these patches and eventually damages the seismic receivers housed inside the streamer. In other words, although the permanent outer layer with antifouling properties may decrease bio-fouling on average, its presence does not preclude or solve the problem of higher roughness patches, and it is not practical to repair or replace this damaged permanent outer layer.

Accordingly, it would be desirable to provide systems and methods that preserve or restore low roughness on the streamer jacket.

SUMMARY

Methods and devices according to some embodiments preserve or restore low roughness on a streamer jacket, thereby diminishing the damaging effect of bio-fouling developing in micro-cracks. By preserving or restoring low roughness on a streamer jacket, a streamer's life cycle is prolonged.

According to one embodiment, there is a method for increasing smoothness of a patch on an outer surface of a device used underwater for a seismic survey. The method includes identifying the patch as having increased roughness compared to the rest of the outer surface. The method further includes applying a substance to cover the patch that has a property of filling micro-cracks and smoothing surface irregularities.

According to another embodiment, there is an apparatus configured to increase smoothness on a patch of a streamer that has been used underwater. The apparatus includes an applicator section configured to cover the patch with a substance that has a property of filling micro-cracks and smoothing surface irregularities.

According to another embodiment, there is a method for restoring low roughness to an outer surface of a streamer. The method includes deploying the streamer in water and recovering the streamer from water, wherein the recovered streamer's outer surface has at least a patch with higher roughness. The method then includes polishing a soft coating to restore a lower roughness on the patch while redeploying the streamer in water, wherein the soft coating has been applied in an area of the at least one patch.

According to another embodiment, there is an apparatus configured to restore low roughness on a streamer's outer shell. The apparatus includes a streamer-polishing section configured to polish the streamer's outer shell to restore smoothness. The streamer-polishing section and the streamer move relative to one another in a longitudinal direction.

According to another embodiment, there is a method for maintaining low roughness on an outer surface of a device used underwater for a seismic survey. The method includes applying a coating made of a self-healing material on at least a portion of the outer surface, with the self-healing material configured to refill subsequently occurring superficial micro-cracks without any external action.

BRIEF DESCRIPTION OF THE DRAWINGS

The accompanying drawings, which are incorporated in and constitute a part of the specification, illustrate one or more embodiments and, together with the description, explain these embodiments. In the drawings:

FIG. 11 is a flowchart of a method for maintaining low roughness on a streamer's outer surface according to another embodiment.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of a streamer usable in marine seismic surveys. However, the embodiments to be discussed next are not limited to these structures, but may be applied to other devices such as cables towing various equipment, such as birds, buoys, deflectors, etc. that are submerged for a long time and thus subject to bio-fouling.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

Methods and devices described below restore low roughness on patches of an outer surface of a submerged device by applying a micro-crack-filling substance and/or polishing the outer surface. Surfaces having low roughness are smooth.

Figure 1:
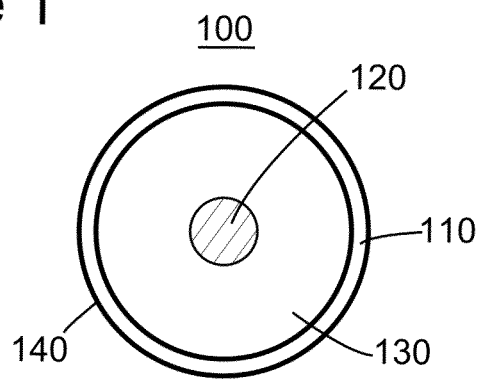
FIG. 1 is a cross-section through a streamer according to an embodiment.

FIG. 1 is a cross-section through a streamer 100 according to one embodiment. The streamer 100 has an outer shell known as streamer jacket 110, which is configured to separate the inside of the streamer from surrounding water when the streamer is submerged. Streamer jacket 110 may include multiple layers of different materials that serve different functions, such as impermeability, flexibility and protection of instrumentation inside the streamer.

Instrumentation housed inside the streamer includes seismic receivers, electrical cables or other electrical components. At least some of the instrumentation (e.g., electrical cables and a strength member) is located, for example, in a central zone 120 of the streamer. The volume 130 inside streamer jacket 110 may be filled with a material lighter than water (e.g., a foam) to make the streamer have neutral buoyancy. An additional outer layer 140 is discussed later in this document.

Figure 2:
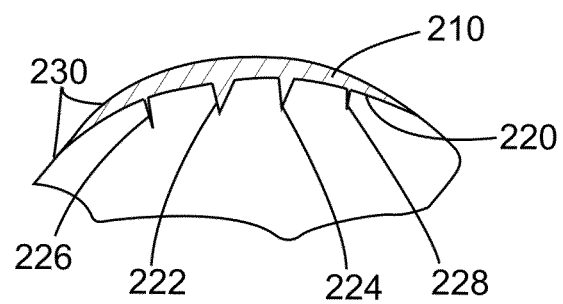
FIG. 2 is a cross-section in a streamer illustrating a substance filling micro-cracks, according to an embodiment.

As previously discussed, when streamers are deployed in seawater and remain exposed to marine microorganisms such as barnacles for a long time, an abundance of localized bio-fouling occurs on surface patches having a higher roughness than the rest of the streamer's outer surface (e.g., longitudinal scratches that may occur during streamer deployment). After recovering the streamer from the water, the streamer's outer surface may be cleaned. A substance able to fill micro-cracks and to make the outer surface smoother may be applied to cure the increased roughness of patches before the streamer is redeployed. For example, FIG. 2 illustrates such a substance 210 applied on a streamer's jacket outer surface 220 filling micro-cracks 222 and 224, and enhancing the streamer's outer surface 230. Note that the damage to the outer surface 220 (see, e.g., also splits 226 and 228) results in a higher roughness in that specific area. Roughness, which is defined by density and depth of the micro-cracks, may be measured, but it is frequently evaluated visually or using image processing. In the end, whether a patch has high roughness and low roughness is indicated by the rate of bio-fouling attaching to the submerged streamer.

Figure 3:
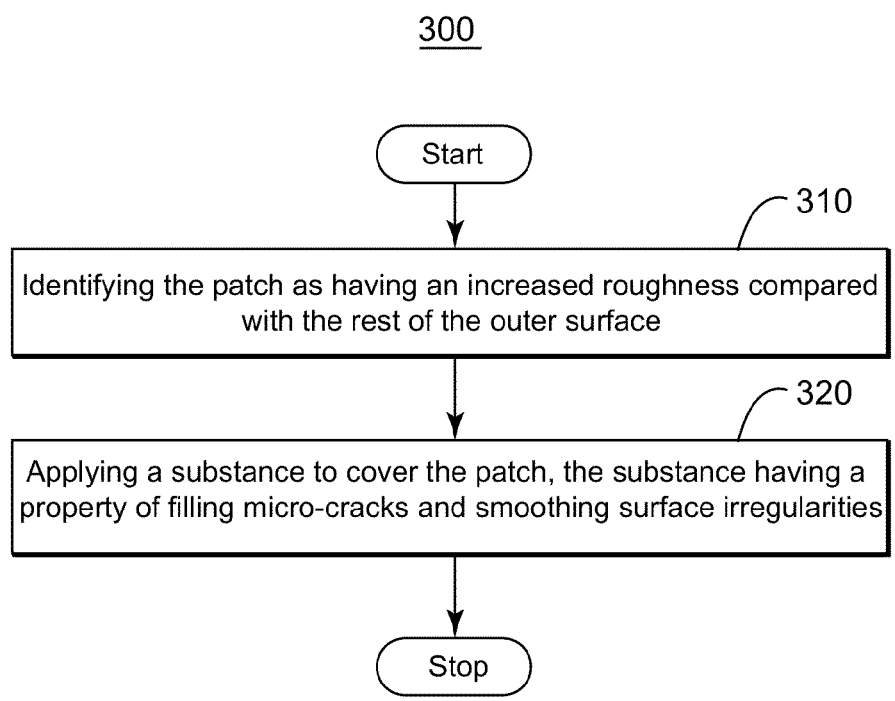
FIG. 3 is a flowchart of a method to cure a patch on an outer surface of a device used underwater for a seismic survey, according to an embodiment.

FIG. 3 is a flowchart of a method 300 to cure a patch on an outer surface of a device used underwater for a seismic survey. The device may be a streamer or other cables, birds, deflectors, buoys, etc.

Method 300 includes first identifying a patch as having increased roughness compared with the rest of the outer surface at 310. Such patches with increased roughness are observed after the streamer is recovered from being in water for a period. The patches may occur incidentally (e.g., scratches due to debris or occurring while the streamer is released in the water) or may be the result of increased stress, such as in portions of a towed device where the device's diameter varies. Note that, in some embodiments, only areas with bio-fouling deposits (not all outer areas of the device) are surveyed to identify one or more increased roughness patches.

Method 300 further includes applying a substance to cover the rougher patch, with the substance having a property of filling micro-cracks and smoothing surface irregularities at 320. The applied substance may be a wax or polymer having a fast polymerization process. The substance may have an antifouling property due to, for example, a biocide substance incorporated in it. Note that areas prone to bio-fouling near the identified patch may also be treated (i.e., have the substance applied thereupon) without further determining whether these areas do actually exhibit a higher roughness.

In FIG. 1, the applied substance is represented as layer 140 surrounding streamer's jacket 110. No conclusion relative to layer 140's thickness should be based on FIG. 1 (which is merely a schematic illustration). Alternatively, the substance may be applied so as not to surround the streamer, being instead tapered off at the patch's edge as illustrated, for example, in FIG. 2. Optionally, the outer surface may be polished after applying the substance to further smooth (longitudinal or radial) the transition from the covered patch to the rest of the device's surface. The substance may be applied shortly before the streamer is redeployed to avoid potential damage while the streamer is stored, for example, on a spool.

The method may further include cleaning the device before applying the substance, and storing the device before or after cleaning. The device may be cleaned mechanically (e.g., using brushes to remove fouling from the outer surface) or chemically (e.g., washing the outer surface in a solvent).

Returning now to applying the substance, this step may include passing the device through the substance so the substance surrounds the device over a predetermined length thereof, and removing any excess substance from the outer surface thereafter. The substance may be applied at a temperature higher than ambient temperature. The substance is preferably applied when the device (e.g., a streamer) is moved to be deployed in the water to minimize potential surface damage before the streamer is submerged.

Figure 4:
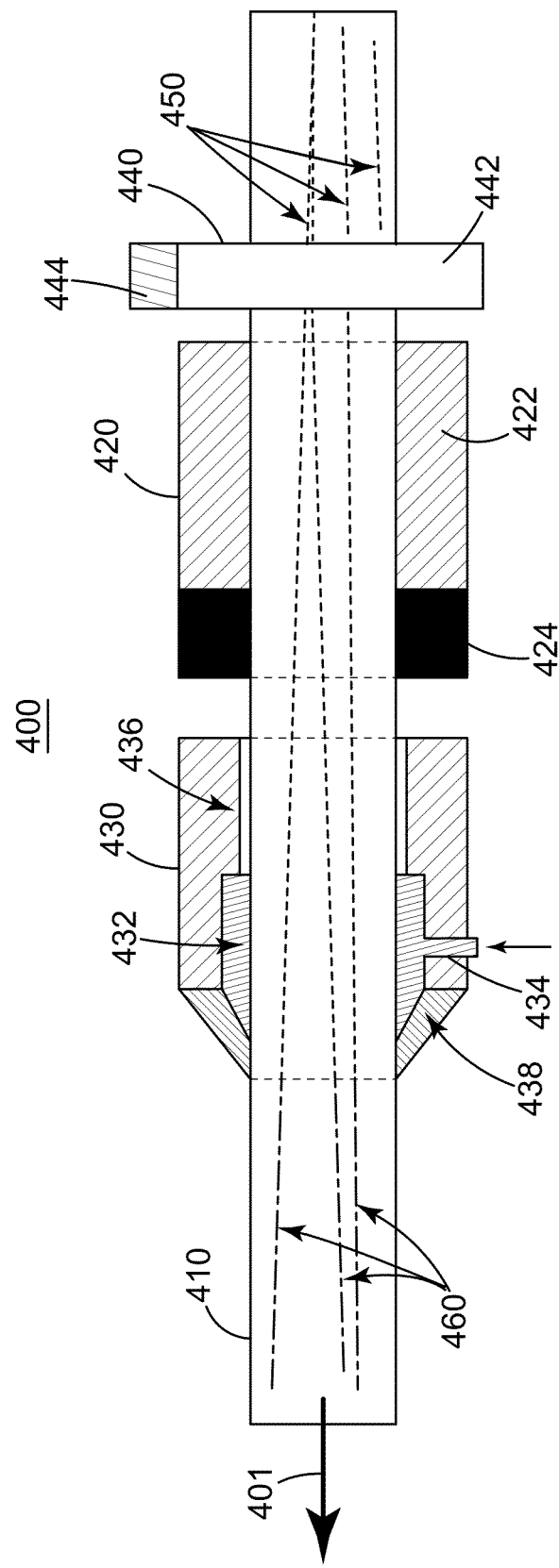
FIG. 4 a schematic diagram of an apparatus according to an embodiment.

Apparatus 400 illustrated in FIG. 4 is configured to apply a substance as specified in method 300. Streamer 410 passes through apparatus 400, or apparatus 400 moves along streamer 410 as suggested by arrow 401. The motion may be the streamer's longitudinal motion while unrolled from the storing spool to be deployed in the water. Due to this relative longitudinal motion, the streamer's outer surface is gradually subjected to cleaning (which is optional) and to application of the substance.

Apparatus 400 includes a cleaning section 420 and an applicator section 430, which are configured to encircle the streamer section passing longitudinally there-through.

Cleaning section 420 may have a first portion 422 inside which the streamer's outer surface is mechanically cleaned (for example, using wheel brushes) and a second portion 424 inside which the streamer's outer surface is chemically cleaned (for example, by exposing the streamer's outer surface to a solvent).

Applicator section 430 may include a wax chamber 432 configured to apply the substance on the streamer's outer surface. Wax chamber 432 has a substance inlet 434 through which the substance is received (as suggested by the arrow pointing up), and is sealed by upstream seal 436 and lips 438 to prevent the substance from leaking outside the wax chamber. Lips 438 are adjacent downstream (as the streamer moves from right to left as suggested by arrow 401) to wax chamber 432 and configured to remove excess substance from the streamer's outer surface as it exits wax chamber 432. The substance may be delivered in wax chamber 432 at a temperature higher than ambient temperature, and, in this case, lips 438 may also be maintained hot.

Apparatus 400 may also include an inspection section 440 configured to identify patches on the streamer's outer surface that have a higher roughness than a roughness threshold. For example, inspection section 440 may include an image acquisition device 442 configured to acquire images of the streamer's outer surface as the streamer moves there-through, and an image processing unit 444 configured to analyze the images and identify patches. Thus, after the streamer passes through apparatus 400, rough patches such as longitudinal patches 450 become smooth treated patches (with low roughness) such as 460.

Inspection section 440 may be located before (i.e., upstream) of cleaning section 420 (as illustrated in FIG. 4) or between cleaning section 420 and applicator section 430. Inspection section 440 may be connected to applicator section 430 to trigger application of the substance only for a given length (substantially equal to the length of the identified patch). However, the presence and use of inspection section 440 is optional and should not be considered a limitation. If no inspection section 440 is present, an operator may visually inspect the streamer and control the applicator section 430's operation. Yet in another embodiment, the substance may be applied throughout the streamer's length.

Apparatus 400 (which may or may not include sections 420 and 440) may be located onboard a vessel towing the streamers and may be used while a streamer is recovered from water or when the streamer is redeployed in the water.

Figure 5:
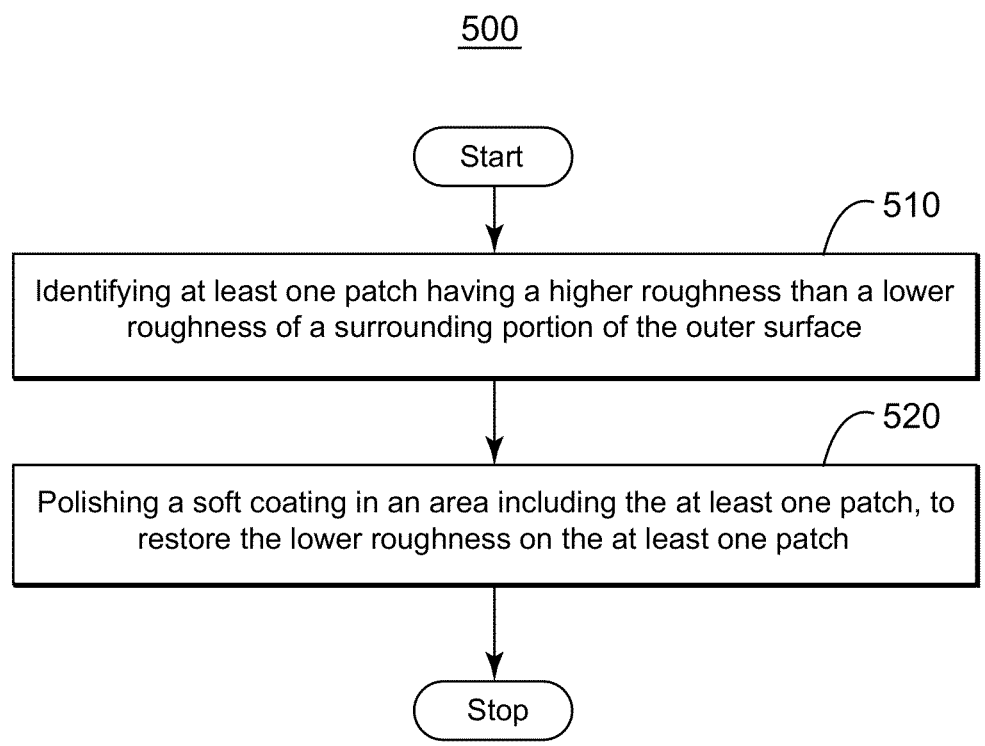
FIG. 5 is a flowchart of a method for treating an outer surface of a streamer to restore a low roughness on a streamer jacket according to another embodiment.

Another way of preserving and restoring low roughness of a device's outer shell is by applying a soft coating that can be easily resurfaced by friction. FIG. 5 is a flowchart of a method 500 for treating an outer surface of a streamer to restore a low roughness on a streamer jacket according to another embodiment. Method 500 includes identifying at least one patch having a higher roughness than a lower roughness of a surrounding portion of the outer surface, at 510. Method 500 further includes polishing a soft coating in an area including the at least one patch to restore the lower roughness on the at least one patch at 520.

The soft coating is easily resurfaced by friction to provide the outer surface with low roughness. For example, the soft coating may be a wax. The soft coating may be applied locally (e.g., in an area prone to damage or where damage has previously occurred) or may cover most or all the outer surface. The soft coating may be reapplied prior to each deployment of the streamer or only when necessary (e.g., if a new rough patch has occurred).

Superficial damage likely occurs when the streamer is deployed and/or while the streamer is underwater, causing the outer surface of the recovered streamer to have a patch with higher roughness. The polishing may be performed while redeploying the streamer in the water to use the streamer's longitudinal motion (e.g., rolling out from the spool on which it has been stored). Additionally, polishing the streamer's outer shell as it is deployed is preferable to minimize damage after polishing but before the streamer is submerged.

Figure 6:
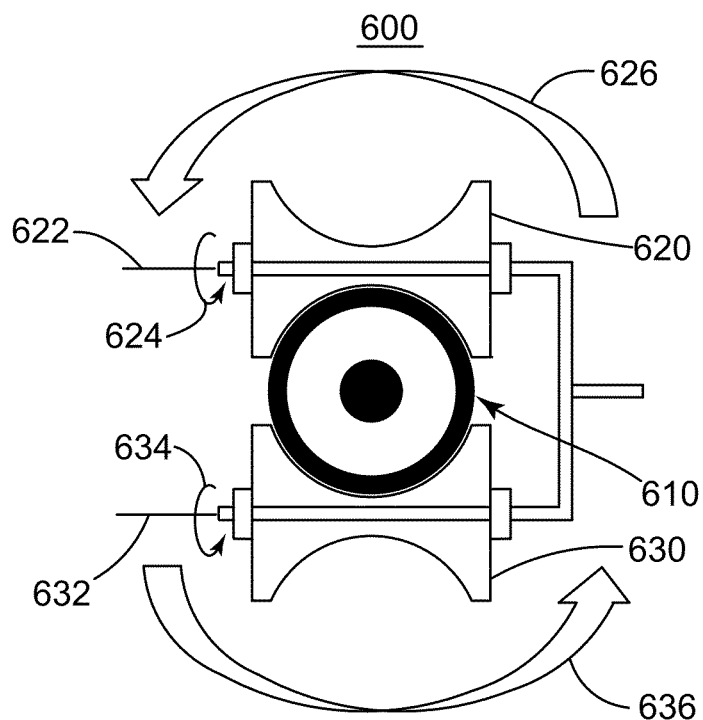
FIG. 6 is a schematic diagram of a portion of an apparatus according to another embodiment.

Method 500 may be performed by an apparatus 600 schematically illustrated in FIG. 6. FIG. 6 is a cross-section perpendicular to a longitudinal direction (which is along streamer 610). Streamer 610 passes through apparatus 600, which includes polishing wheels 620 and 630 rotating around axes 622 and 632, respectively (as suggested by arrows 624 and 634). Axes 622 and 632 are substantially perpendicular to the longitudinal direction. Polishing wheels 620 and 630 may also be rotated around streamer 610 in a plane substantially perpendicular to the longitudinal direction as suggested by arrows 626 and 636 in FIG. 6. Although a single pair of polishing wheels (i.e., 620 and 630) is illustrated in FIG. 6, plural pairs of such wheels may be disposed in the longitudinal direction. Wheels 620 and 630, which have profiles complementary to the streamer's outer surface, are biased toward the longitudinal axis to apply a slight pressure thereon and rotate at high speed (e.g., between 100-1800 rpm) to polish by friction the outer surface of streamer 610. The wheels may be made of polyurethane with an outer layer of polishing structure (e.g., fabrics, cotton, polyurethane pad), called polishing pad.

Apparatus 600 may also include a cleaning portion, such as cleaning section 420 in FIG. 4, and a controller similar to inspection section 440 in FIG. 4. Apparatus 600 may be located onboard a vessel towing streamers and is preferably used while a streamer is deployed in the water.

Figure 7:
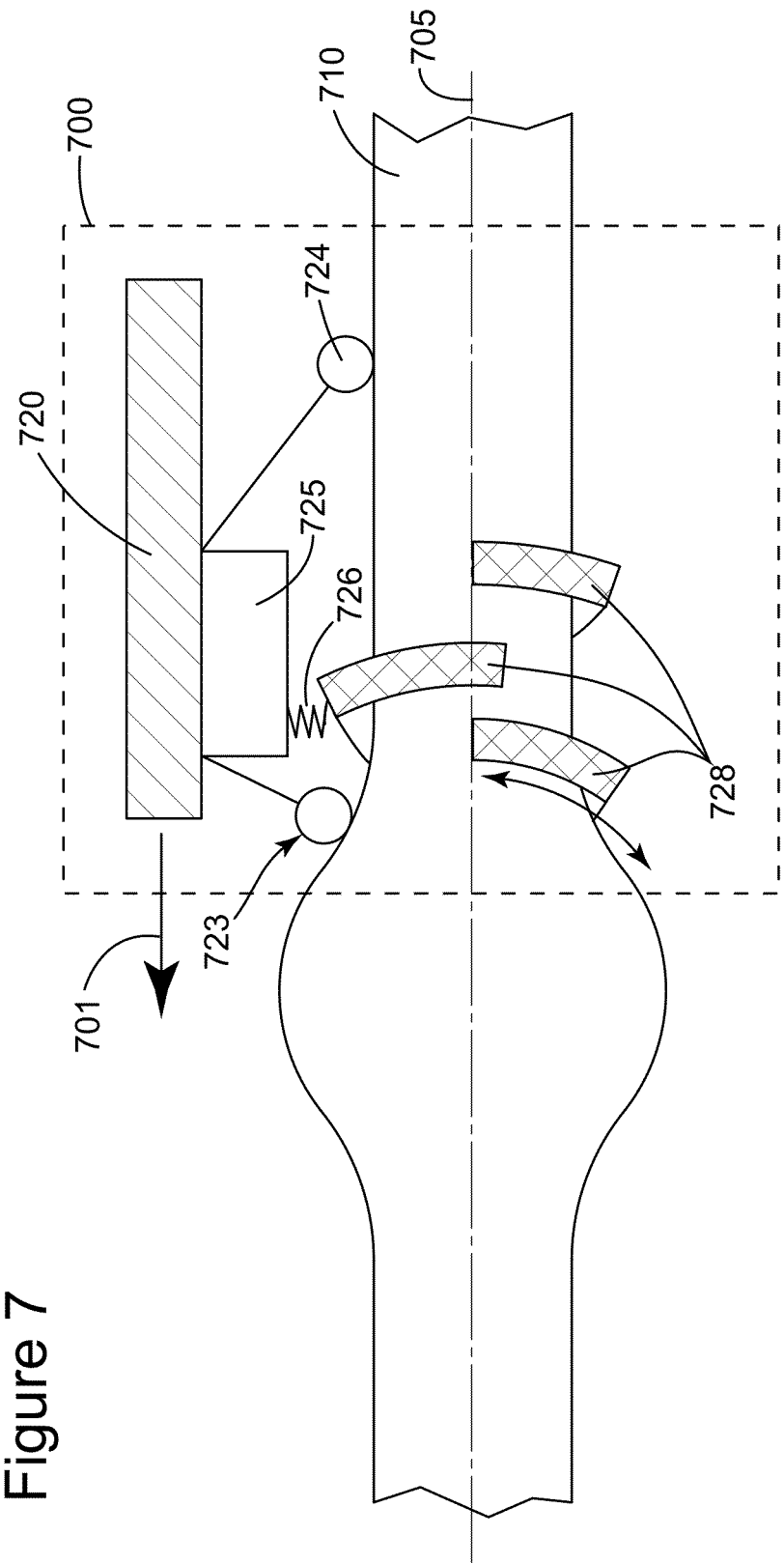
FIG. 7 is a schematic diagram of a portion of an apparatus according to another embodiment.

FIG. 7 is a schematic diagram of a polishing apparatus 700 according to another exemplary embodiment. Apparatus 700 includes a cart 720 configured to move along a streamer 710. Apparatus 700 and streamer 710 have a relative longitudinal motion as suggested by arrow 701. Streamer 710 may be moving, while apparatus 700 may be stationary. Wheels 723 and 724 are positioned ahead and behind cart 720 pushing the cart's edges up and down to accommodate a portion of streamer 710 having a larger diameter.

Polishing pads 728 are attached to the cart via a holding system 725 that includes a spring type element 726. Holding system 725 and cart 720 are flexibly connected to bias polishing pads 728 toward the longitudinal axis 705, while accommodating streamer portions of different diameters within a predetermined range.

Figure 8A:
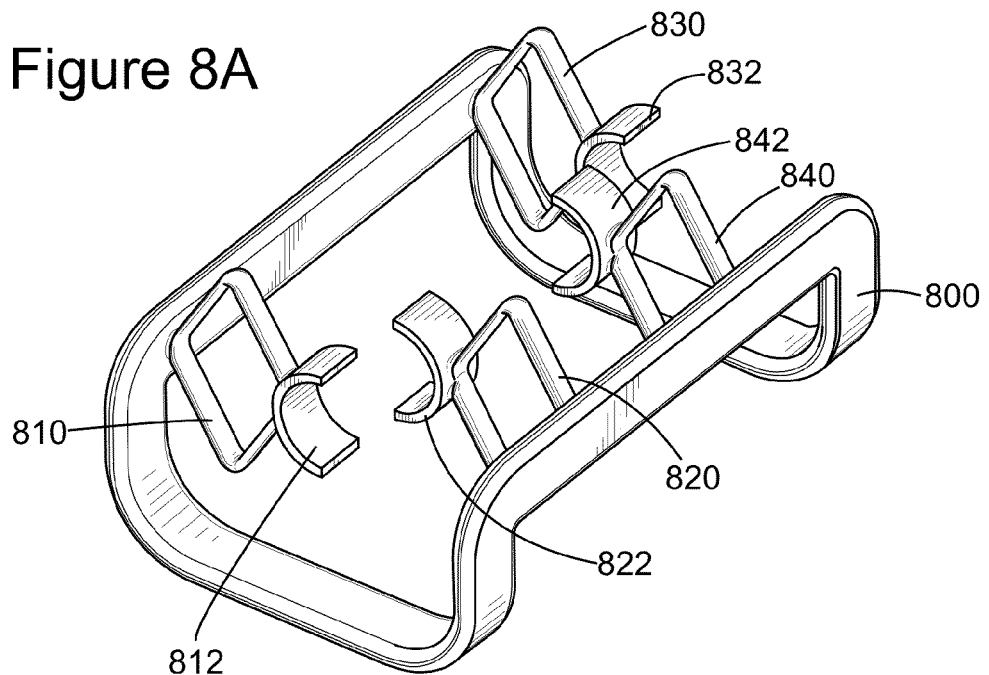
FIGS. 8A and 8B illustrate a portion of an apparatus according to another embodiment.
Figure 8B:
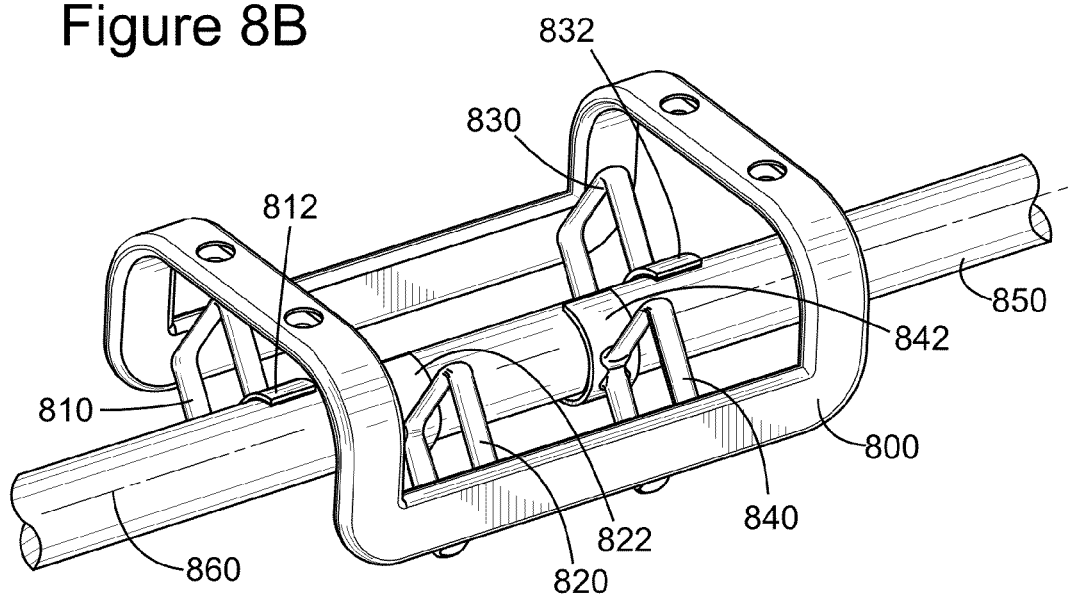

FIGS. 8A and 8B illustrate a holding system including a bracket 800 that has mounted thereon spring-type elements 810, 820, 830, 840 configured to bias polishing pads 812, 822, 832, and 842 toward streamer 850. In addition to the relative longitudinal motion of the apparatus and the streamer, polishing pads 812, 822, 832 and 842 may have an additional translation motion along longitudinal axis 860 and a rotation motion around longitudinal axis 860. A polishing substance may be applied on the polishing pads.

Figure 9:
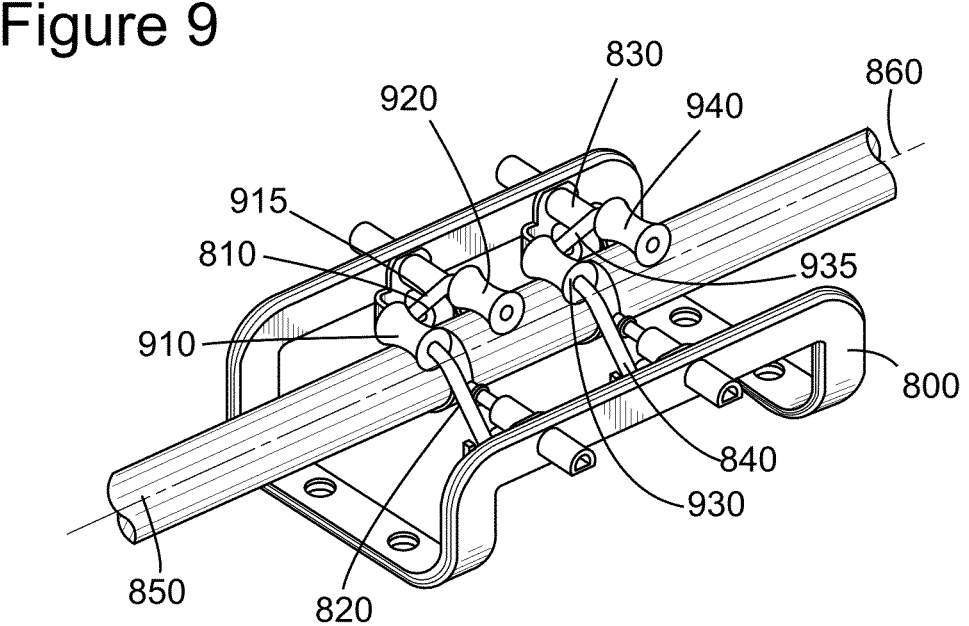
FIG. 9 illustrates a portion of an apparatus according to another embodiment.

In one embodiment of the polishing apparatus partially illustrated in FIG. 9, wheels 910 and 920 are coupled via a lever 915 to spring-type elements 810 and 820. Wheel 910 is positioned to roll along streamer 850 ahead of (upstream) the polishing pads attached to spring-type elements 810 and 820.

Wheel 920 is positioned to roll along streamer 850 behind (downstream) these polishing pads. Wheels 930 and 940 coupled via a lever 935 to spring-type elements 830 and 840 are arranged and operate similar to wheels 910 and 920. When the streamer's diameter becomes larger, wheel 920 is pushed away from longitudinal axis 860 so that lever 915 is no longer parallel to the longitudinal axis. Lever 915 pulls spring-type elements 810 and 820 to decrease bias applied to the polishing pads, thereby allowing them to move away from longitudinal axis 860. When the over-molded (i.e., larger diameter) portion has passed, wheel 920 slides back closer to longitudinal axis 860, and, via lever 915, actuates spring-type elements 810 and 820 to push the polishing pads back, closer to longitudinal axis 860. Note that throughout this moving away from and back closer to the longitudinal axis, the polishing pads remain in contact with the streamer's outer surface.

The polishing apparatus partially illustrated in FIG. 9 operates automatically. However, as previously mentioned, another embodiment may include a controller similar to inspection section 440 in FIG. 4 (i.e., having an image acquisition device 442 configured to acquire images of the streamer's outer surface as the streamer moves there-through, and an image processing unit 444). The controller is configured to detect when the streamer polishing section (e.g., bracket 800) encounters an obstacle along the streamer, and to control the streamer polishing section to move away from the longitudinal axis upon detecting the obstacle. The controller may further detect when the streamer polishing section has passed the obstacle, and control the streamer polishing section to move back closer to the longitudinal axis upon detecting that the obstacle is no longer present along the streamer. In one embodiment, the controller may be configured to issue an alarm (e.g., a beep or a flashing beacon) to signal the obstacle's presence. The controller may also be connected to a streamer spool configured to unroll or roll the streamer around the streamer spool, before or after passing though the streamer polishing section. In this case, the controller may stop the streamer spool upon detecting the obstacle.

Figure 10:
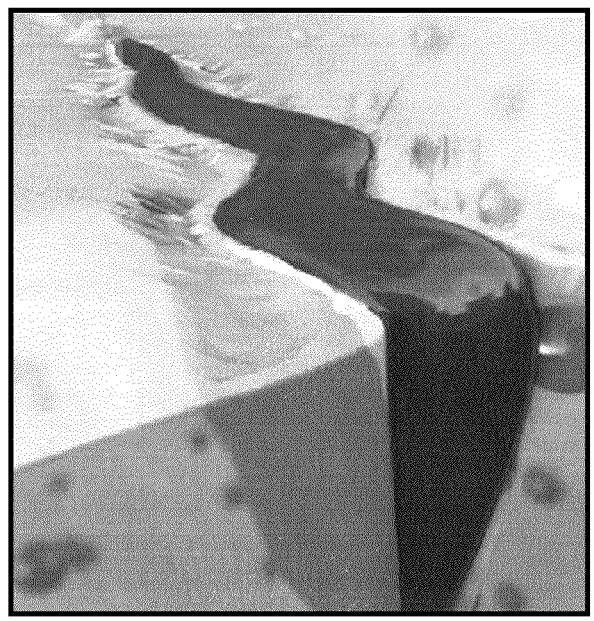
FIG. 10 is a photo of a self-healing material filling a surface micro-crack.

Another way of maintaining low roughness on an outer surface of a device used underwater for a seismic survey is by applying a coating made of a self-healing material on at least a portion of the outer surface. A self-healing material is configured to refill superficial micro-cracks without an external action. For example, if the self-healing material is applied in an area prone to micro-cracks, the self-healing material fills subsequently occurring micro-cracks without requiring detection, thereby preserving the surface's low roughness. FIG. 10 is a photo illustrating a self-healing material filling a superficial micro-crack. For example, the self-healing material may be rubber.

FIG. 11 is a flowchart of a method 1100 for maintaining low roughness on a streamer's outer surface. Method 1100 includes preparing a streamer's outer surface for applying a coating at 1110. Step 1110, which is optional, may include mechanical and chemical cleaning previously described in this document.

Method 1100 further includes applying the coating made of a self-healing material on at least a portion of the streamer's outer surface at 1120. This coating may not be applied to the streamer's whole outer surface, but only on portions prone to bio-fouling. Also, the coating may be applied when the streamer is manufactured, shortly thereafter (before being used underwater), or at any other time during the streamer's life cycle.

The disclosed exemplary embodiments provide methods and apparatuses for preserving and restoring low roughness on an outer surface of a device used underwater for a seismic survey. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method to cure a patch on an outer surface of a device used underwater for a seismic survey, the method comprising:
   identifying the patch as having an increased roughness; and
   applying a substance to cover the patch, the substance having a property of filling micro-cracks and smoothing surface irregularities.

2. The method of claim 1, wherein the device is a streamer.

3. The method of claim 1, further comprising:
   polishing the outer surface after applying the substance.

4. The method of claim 1, wherein the applying of the substance includes:
   passing the device through the substance such that the substance surrounds the device over a predetermined length thereof; and
   removing an excess of the substance on the outer surface after the passing.

5. The method of claim 1, further comprising:
   moving the device longitudinally to gradually apply the substance to cover the patch.

6. The method of claim 5, wherein the device is moved longitudinally to be deployed after applying the substance.

7. The method of claim 1, further comprising:
   cleaning the device before the applying; and
   storing the device before or after the cleaning.

8. A method for treating an outer surface of a streamer, the method comprising:
   identifying at least one patch having a higher roughness than a lower roughness of a surrounding portion of the outer surface; and
   polishing a soft coating in an area including the at least one patch, to restore the lower roughness on the at least one patch.

9. A method for maintaining a low roughness on an outer surface of a device used underwater for a seismic survey, the method comprising:
   applying a coating made of a self-healing material on at least a portion of the outer surface, the self-healing material being configured to refill superficial micro-cracks without an external action.

* * * * *